UNITED STATES PATENT OFFICE.

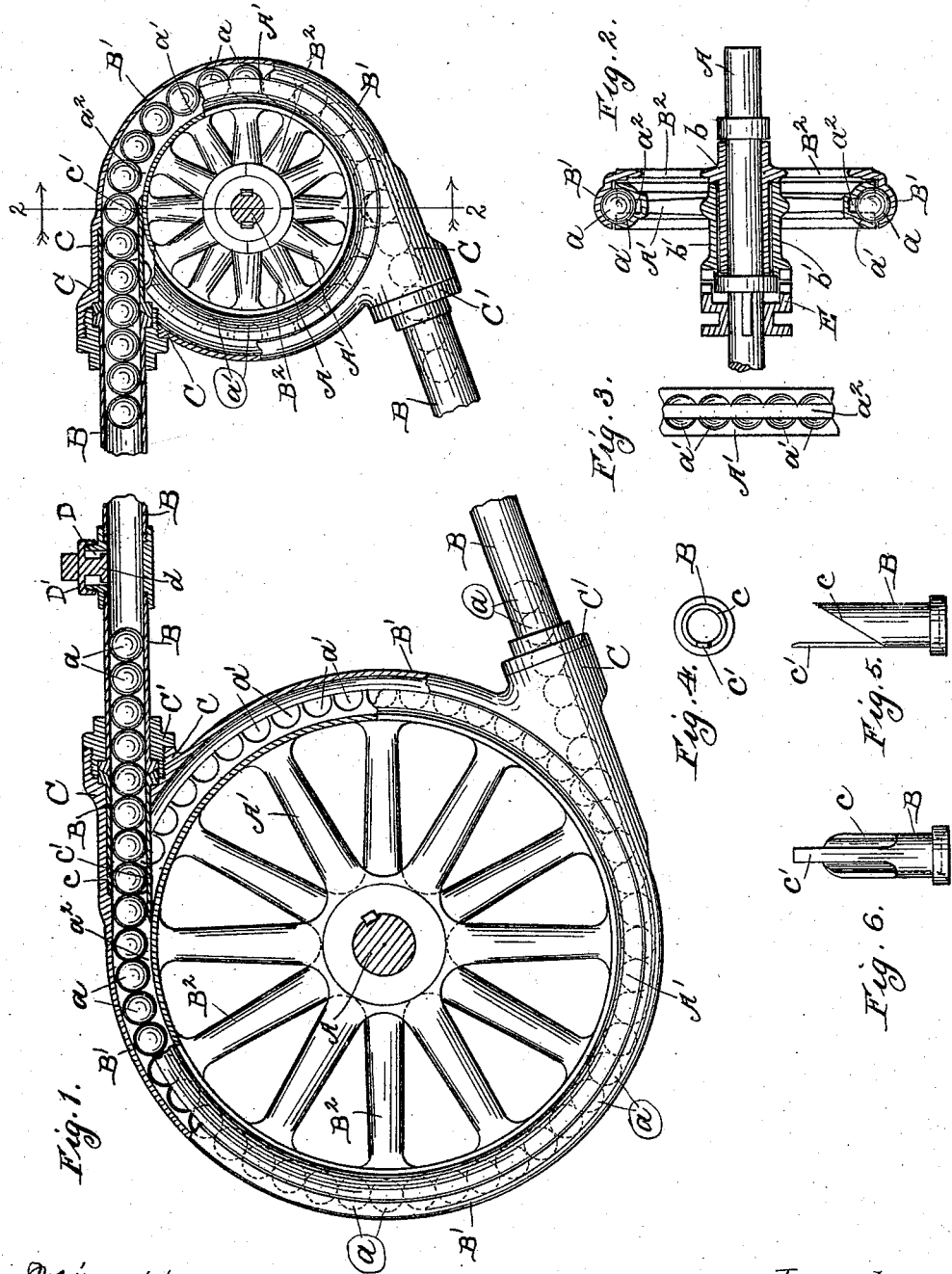

JOHN FLINDALL, OF CHICAGO, ILLINOIS.

MEANS FOR TRANSMITTING POWER.

SPECIFICATION forming part of Letters Patent No. 576,105, dated February 2, 1897.

Application filed March 9, 1896. Serial No. 582,372. (No model.)

*To all whom it may concern:*

Be it known that I, JOHN FLINDALL, of Chicago, in the State of Illinois, have invented certain new and useful Improvements in Means for Transmitting Power, of which the following is a specification.

My invention relates to means for transmitting rotary motion; and the object of my improvement is to provide an arrangement and application of separate balls whereby rotary motion may be carried from one shaft to another.

I attain the object by the means illustrated in the accompanying drawings, in which—

Figure 1 is a side elevation, partly in section, of an apparatus embodying my invention. Fig. 2 is a section on the line 2 2 of Fig. 1, looking toward the right. Fig. 3 is a detail showing a face of a fragment of the periphery of a wheel or pulley. Figs. 4, 5, and 6 are details, respectively showing an end, side, and bottom view of the same part.

In the drawings, A A designate a pair of parallel shafts which it is assumed may be journaled in the ordinary way in any sort of a suitable frame for their support, so as to be revoluble by means of power applied to either of them by any ordinary means. The means for transmitting rotation from one of the shafts to the other comprises a series of balls $a$, adapted to travel in a tubular way B B' about wheels A' A', carried by the shafts. The wheels upon their peripheries are provided with a series of preferably semiglobular recesses or pockets $a'$, which touch or cut one another, and a groove $a^2$, cutting the bottom of the pockets. The balls engaging the wheels in the pockets impinge one another, so that as one wheel is revolved it forces the balls through the way and upon the other wheel and thereby causes it to revolve. The outer part B' of the tubular way which surrounds the separate wheels comprises a rim of half-tubular form connected by spokes $B^2$ to a hub or collar $b$ on the shaft A, said rim projecting over the periphery of the wheel, so as to form, preferably, a semicylindrical cover over the pockets, and having enlarged tangential projections C, provided with threaded couplings C' for connecting the other part of the tubular way, which is intermediate the wheels. That part of the rim which is between the projections C serves to cover the pockets merely, but is not essential to the operation of the device, as the balls do not pass through this space. The end of the tube which enters the projection C is cut on a bevel $c$ and has a tongue $c'$, which is adapted to the groove $a^2$ and serves to shift the balls from the pockets and cause them to enter the tube in operation. The bevel end provided with the tongue is best made on a short secton of tube, as shown in Fig. 5, so as to fit into the projection C and be joined to the other part of the tube by the coupling C', as seen in Fig. 1.

The shipping tongues are extended in the groove through the pockets in line with the inside of the tube from its junction with the wheel to the bottom of the pockets, the tongues being parallel with the outside of the tube along the beveled end, which extends further upon the wheel than the inside, so that no greater space than the caliber of the tube is left between the tongue and the opposite wall of the beveled part of the tube, which covers that part of the circle over which the tongue extends. Without the shipping tongues thus arranged in the grooves through the pockets the balls in passing that part of the circle covered by the beveled end of the tube are liable to buckle and be thrown out of impingement with one another, so as to produce halting or loss of motion.

The tubular way is provided with an opening D to receive the balls, which opening has a screw-cap D', carrying an inner projection $d$, adapted to close or obstruct the opening on the line of the interior of the tube, so as to prevent any displacement of the balls when passing the opening.

The shaft A revolves in the collar $b$, which in the present instance is extended through the hubs $b'$ of the wheels and forms the spindle upon which the wheels revolve, and the shafts have sliding clutches E, adapted to be slid one way into engagement with the hub $b'$ for transmitting the motion of wheel to the shaft, or of the shaft to the wheel, and the other way to disengage the wheel and shaft, so that the one may revolve without the other.

The arrangement and application of balls in the manner described for transmitting power is not limited to an arrangement in which the wheels are placed in the same plane and connected by straight tubes, as here illustrated, but may be applied between wheels placed at any angle to one another, provided the intermediate tubular way can be arranged on such gradual curves as to permit the balls to pass through without obstruction, and on this account this means for the transmission of power may be applied under circumstances where a belt or cog gear would not be practicable.

What I claim is—

1. The means for transmitting power comprising a pair of wheels axially mounted and provided with pockets and a groove cutting through the pockets, a tubular way about the wheels having beveled portions in conjunction with the wheels, a series of impinging balls in the tubular way engaging the pockets, and shipping tongues in the grooves extended from the inner side of the bevel of the tubes at their junction with the wheels to the bottom of the pockets for the purposes specified.

2. The means of transmitting power comprising a pair of wheels axially mounted and provided with pockets and a groove cutting through the pockets, a rim forming a semicircular cover over the pockets to a segment of the wheels terminating in tangential tubular projections to said wheels and provided with couplings, tongues extending in the groove through the pockets from the inside of the tubular junction with the wheels, parallel with the opposite wall of the tube, to the bottom of the pockets, tubular connections intermediate the tangential projections, and a series of balls filling the segment of the rim and tubular connections and engaging the pockets as specified.

JOHN FLINDALL.

Witnesses:
ANNIE M. ADAMS,
ELLIS LEVY.